United States Patent
Sha et al.

(10) Patent No.: US 12,432,521 B2
(45) Date of Patent: Sep. 30, 2025

(54) VISUAL GUIDANCE OF AUDIO DIRECTION

(71) Applicant: EMC IP Holding Company LLC, Hopkinton, MA (US)

(72) Inventors: Danqing Sha, Shanghai (CN); Amy N. Seibel, Newton, MA (US); Eric Bruno, Shirley, NY (US); Zhen Jia, Pudong (CN)

(73) Assignee: EMC IP Holding Company LLC, Hopkinton, MA (US)

(*) Notice: Subject to any disclaimer, the term of this patent is extended or adjusted under 35 U.S.C. 154(b) by 247 days.

(21) Appl. No.: 17/451,775

(22) Filed: Oct. 21, 2021

(65) Prior Publication Data

US 2023/0125654 A1     Apr. 27, 2023

(51) Int. Cl.
  *H04S 7/00*   (2006.01)
  *G06F 3/16*   (2006.01)
  *H04R 1/32*   (2006.01)
  *H04R 3/00*   (2006.01)

(52) U.S. Cl.
  CPC .............. *H04S 7/40* (2013.01); *G06F 3/167* (2013.01); *H04R 1/326* (2013.01); *H04R 3/005* (2013.01); *H04S 2400/11* (2013.01); *H04S 2400/15* (2013.01)

(58) Field of Classification Search
  CPC .... H04S 7/40; H04S 2400/11; H04S 2400/15; H04S 7/305; H04S 7/304; G06F 3/167; G06F 3/165; H04R 1/326; H04R 3/005; H04R 2205/041
  See application file for complete search history.

(56) References Cited

U.S. PATENT DOCUMENTS

| | | | | |
|---|---|---|---|---|
| 9,971,403 | B1* | 5/2018 | Kallmeyer | G06F 3/0346 |
| 2016/0255455 | A1* | 9/2016 | Kulavik | H04S 7/40 |
| | | | | 381/309 |
| 2017/0021768 | A1* | 1/2017 | Jaegal | B60W 50/14 |
| 2018/0203663 | A1* | 7/2018 | Lehtiniemi | H04R 3/005 |
| 2018/0302738 | A1* | 10/2018 | Di Censo | G06F 3/011 |
| 2020/0037097 | A1* | 1/2020 | Torres | H04S 7/303 |
| 2021/0364281 | A1* | 11/2021 | Petill | H04R 3/005 |

* cited by examiner

*Primary Examiner* — Phung-Hoang J Nguyen
(74) *Attorney, Agent, or Firm* — Workman Nydegger

(57) ABSTRACT

One example method includes generating sound information regarding sound sources in an environment. The sound information is generated by separating and localizing the sound sources. The sound information is then presented as guidance to a user. The guidance may be presented graphically in a user interface, haptically, or in another manner.

18 Claims, 6 Drawing Sheets

VISUAL GUIDANCE OF AUDIO DIRECTION

FIELD OF THE INVENTION

Embodiments of the present invention generally relate to sound systems and operations. More particularly, at least some embodiments of the invention relate to systems, hardware, software, computer-readable media, and methods for providing guidance, including visual guidance, regarding sound sources in an environment.

BACKGROUND

The ability to identify information about sound, including the direction from which a sound is coming, is something that many people take for granted. People with typical hearing can usually tell where a sound originates and can often discriminate speech in noisy environments. This is more difficult, however, for many people. For example, people suffering from various forms of hearing loss may not have this ability. A person with partial hearing loss, such as single-sided deafness (SSD), may not be able to determine the direction from which a sound comes as easily as a person with normal hearing.

In addition, people with hearing loss often have difficulty hearing conversations on their impaired side, have difficulty localizing sound, and have difficulty understanding speech in the presence of background noise. People with some hearing loss may also struggle in interpersonal interactions and have difficulty focusing on sound sources in large, open environments. In the case of SSD, for example, a person's own head often causes a shadow effect with regard to sounds on the hearing-impaired side. In effect, the head casts an acoustic shadow that makes hearing difficult. Systems and methods are needed to help hearing impaired person to better localize sounds.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
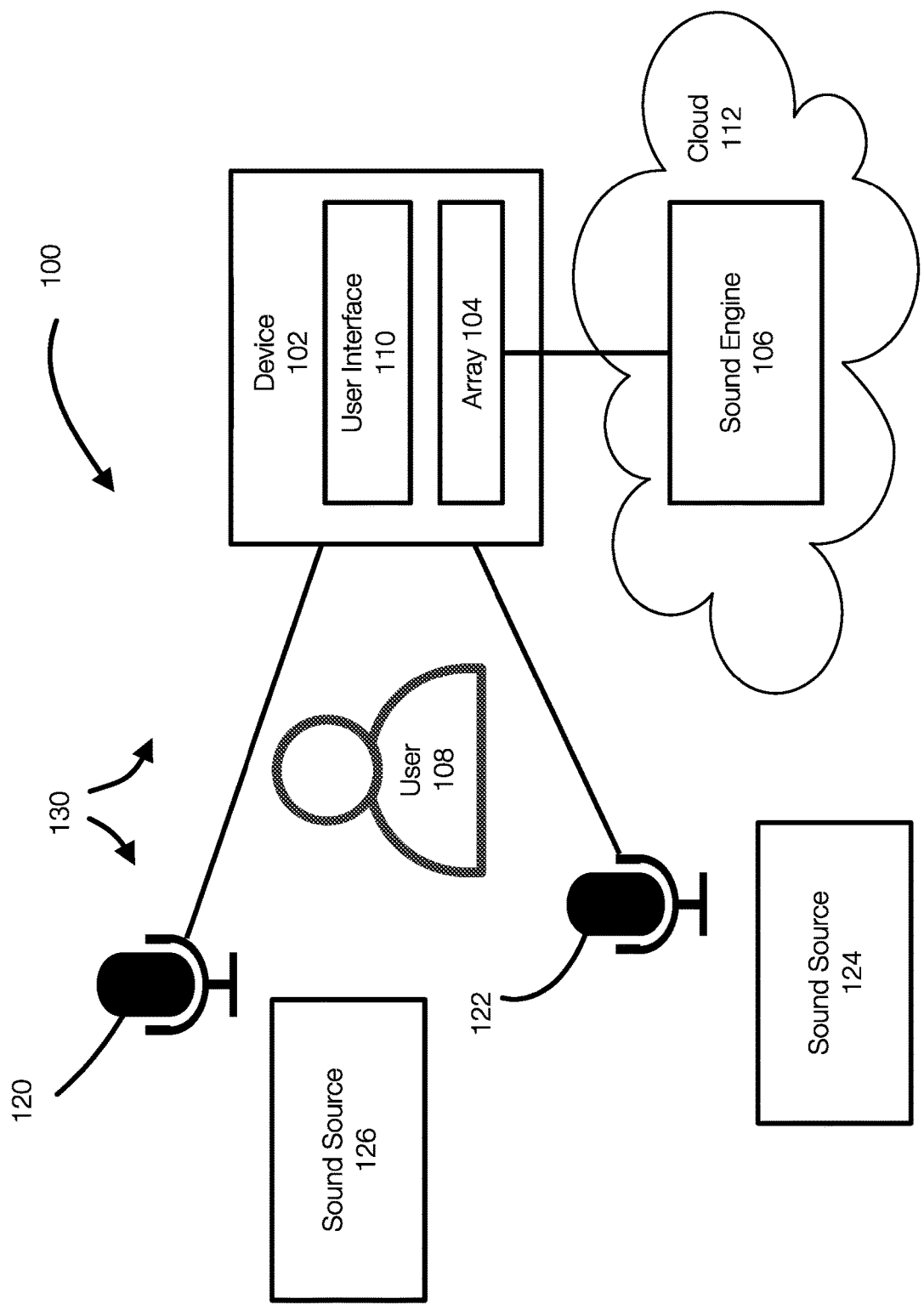
FIG. 1 discloses aspects of a system, including a sound engine, configured to provide guidance to a user regarding sound sources in an environment.

Embodiments of the present invention generally relate to sound operations and systems configured to perform sound operations. More particularly, at least some embodiments of the invention relate to systems, hardware, software, computer-readable media, and methods for sound operations including sound separation operations, sound localization operations, and sound guidance operations. Sound guidance operations may include, by way of example only, presenting sound information visually, haptically, audibly, or the like or combination thereof.

Embodiments of the invention relate to systems and methods for presenting guidance regarding sound and sound sources. An example of presenting guidance is to present sound information in a visual or visualized form, such as in a user interface.

Sound information may be generated or derived from sounds in an environment that are received by at least one microphone array. A sound engine, for example, may be configured to provide guidance to a user regarding sound in the user's environment by visually presenting the sound information. More specifically, the sound engine may receiving input from a microphone array. The received input is processed to adaptively separate and localize sound sources in an environment. When a sound or sound source in an environment is localized and information about the sound is generated, the sound engine may generate sound information in a manner that can be presented visually to a user. The visualization may include, in a visual manner, characteristics of the sound source in real time such as sound location (or origin), sound direction, sound pressure level (SPL), loudness, or the like or combination thereof. For example, these characteristics can be represented graphically using graphics or the like. Further, the guidance may also be provided haptically, audibly, and/or in another manner.

For example, devices in the user's environment, devices worn by the user, and devices being used by the user may be able to provide guidance to the user. For devices with a display, the guidance or sound information may include graphics to convey characteristics of the sound source. A sound source may be indicated by a graphic such a small speaker or a wave. The graphic may be stationary or moving. Arrows may be provided to convey trajectory. The size of the graphic may convey magnitude. Thus, sound information can use graphics (or text) to convey loudness/SPL, direction, distance to sound, trajectory or the like or combination thereof.

In addition or in the alternative, guidance may also be presented in other manners, such as haptically. A smartwatch, for example, may be configured to vibrate when a sound is behind the user. Different vibrations patterns can convey information, such as location relative to the user (e.g., right, left, behind, front). The display of a smartwatch may also convey information.

A display, such as a computer or laptop display, may convey sound information with graphics as previously described. An augmented or virtual reality (AR) headset may incorporate the sound information into the display. Stated differently, sound information can be overlaid onto frames being displayed. The display of an AR headset may adapt the sound information based on movement of the user or for other reasons.

Embodiments of the invention convey and update real-time sound source information to a user. This allows the user to have increased sound awareness and a better understanding of sound depth. This allows persons that have challenges in localizing sounds and understanding speech in noisy environments to have improved situational awareness. Further, any processing performed by the sound engine or by embodiments of the invention may be offloaded to an edge or cloud server. Embodiments of the invention are applicable in real life environments and in virtual environments including video games or virtual gatherings.

Embodiments of the invention can be implemented in user devices such as smart devices (personal wearable devices, smartphones) and other devices such as laptops. These devices can help users better understand their sound environment in many different real and virtual environments. Thus, embodiments of the environment include real and virtual environments. Embodiments of the invention help users visualize or haptically understand their sound environment.

FIG. 1 illustrates an example of an environment in which sound operations including sound guidance or sound visualization operations may be performed. FIG. 1 illustrates an environment 100 in which a user 108 may be present. The environment 100 may be a room (e.g., an office, a home office), a store such as a café, a conference LU room, an outdoor environment, or the like. The user 108 may be using a device 102 in the environment 100. Other user devices (e.g., wearable devices, smart speakers, displays) may also be present in the environment. The device 102 may be a computing device such as a desktop or laptop computer, a smartphone, a smartwatch or other wearable device, an AR headset, or the like. The device 102 may also represent multiple devices in use by the user 108. When multiple devices are used, the visualizations may be adapted to account for the different locations or orientations of the devices relative to each other.

In addition to speech of the user 108, other sounds in the environment, represented by sound sources 124 and 126, may be present in the environment. The source sources 124 and 126 may include noise such as speech of other users or persons in the environment 100, temporary noises (e.g., air conditioning, traffic, footsteps), and other noise such as radio, humming, buzzing, or the like or combination thereof.

Embodiments of the invention receive all sound in an environment and are able to separate and localize multiple sound sources. After separating and localizing the sound sources, embodiments of the invention may generate sound information that is presented as guidance to the user 108. The guidance may be presented visually, haptically, or the like.

After sound separation and sound localization and after the guidance is presented visually, a user may be able to select a specific sound source of interest. For example, a specific speaker or voice may be selected from several voice sound sources. The voice sources may be presented in a text list that allows the user to select one of the voices. In the alternative or in combination, the voice sources may be represented graphically and can simply be selected, for example by clicking. Depending on the interface, grouped sound sources (e.g., a group of people huddled and talking together) can be manipulated by scrolling or zooming in order to view and select individual sound sources. In fact, settings for the user interface may allow a user to define how multiple sound sources can be initially displayed. The user interface may focus on a specific location, a specific type of sound, or the like. In some examples, the user interface may allow the whole environment to be visualized.

When the guidance is presented visually, the guidance may be presented in a user interface 110. If the user interface 110 is a display, the sound information or guidance may be illustrated in the user interface 110 using icons or other graphics. Sound source data can be presented graphically to convey loudness, SPL, direction (e.g., a person walking while talking), distance, or the like. Relative loudness or other comparative characteristics of the sound sources may also be displayed. For example, if a wave is used to visually depict a sound source, the size of the wave can convey loudness of the sound source. This allows a user to visually discern which sound source is the loudest, for example. The position of the wave may change over time to reflect movement or an arrow can be used to indicate movement or trajectory of a sound source.

If the device 102 is an AR device, the device 102 may have a spatial mapping (e.g., a SLAM (Simultaneous Location and Mapping) or marker-based registration) to understand the surrounding environment. The sound information can be overlaid onto the video frames. There could also be an interface to provide a summary of the acoustic information and to provide suggestions about how to improve audio quality. The user may take actions based on this guidance, such as turning their head to the sound of interest. The user may also be provided with information regarding their own speech. This may allow a user to talk softer or louder as needed or desired.

The environment 100 may also include one or more microphone arrays, illustrated as arrays 104, 120, and 124. The array 104 may be integrated with the device 102 (e.g., placed in the display, around the display, or in another location in the device). The arrays 120 and 122 may be external microphone arrays that may be placed in the environment 100. The arrays 120 and 122 may be configured to communicate in a wireless and/or wired manner with the device 102. Thus, sound information generated by the arrays 104, 120, and 122 (also referred to as arrays 130) may be delivered to the device 102. The arrays 104, 120, and/or 122 may include or be associated with some processing power, such as a controller, that may be able to process received sound signals.

A sound engine 106 is configured to process the signals generated by the arrays 130. In this example, the sound engine 106 is located in an edge server, an edge cloud, the cloud 112 (e.g., in in a datacenter) or other suitable location. The sound engine 106 may have access to or include processing power capable of processing the sound signals more efficiently and more quickly than the device 102 and/or the array 130 themselves. The sound engine 106 may be implemented in the cloud 112, on the device 102, and/or in the arrays 130. In another example, different aspects of the sound engine 130 may be at different locations.

Signals or data from the arrays 130 may be used to perform processing such as sound source localization, dereverberation, echo cancellation, sound extractions, sound separation including speech/noise separation, and the like.

Figure 2:
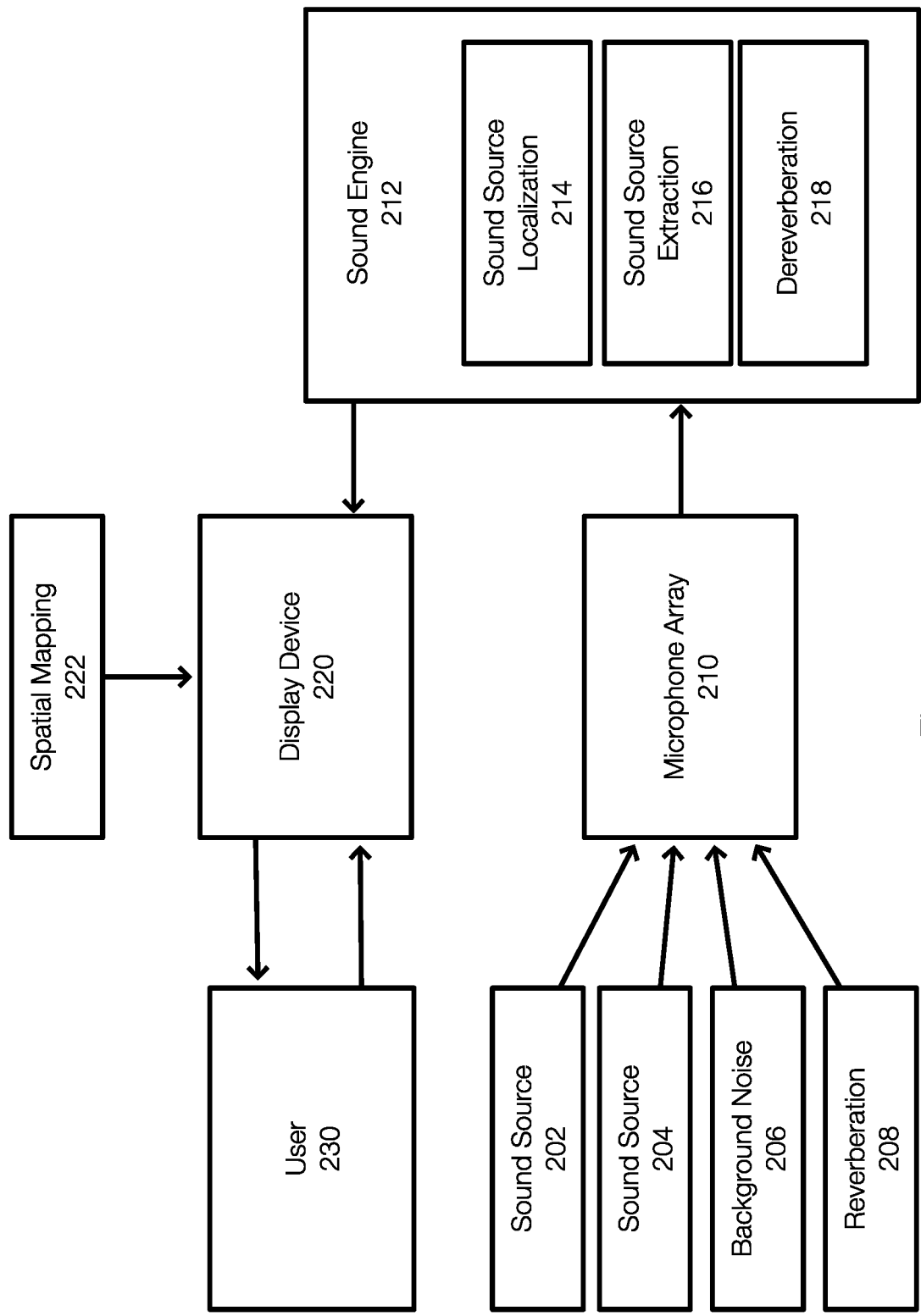
FIG. 2 discloses aspects of a system configured to generate guidance regarding sound sources in an environment and provide guidance to a user visually, haptically, and/or audibly.

FIG. 2 illustrates an example of a system configured to perform sound operations including guidance operations, guidance generation operations, and the like. In this example, a microphone array 210 may receive input from multiple sound sources, represented by sound sources 202 and 204, in an environment. Certain sound sources, such as background noise 206 and reverberation 208 are illustrated.

The microphone array 210, which is an example of one of the arrays 104, 120 and 122, may include one or more individual microphones that are arranged in space. The individual microphones are typically spaced apart from each other and arranged in a pattern or other configuration. Further, each of the microphones in the array 210 may be individually controllable. Thus, each microphone can be turned on/off independently. Further the sensitivity and/or other microphone characteristics or each microphone in the array can be controlled independently.

The sound engine 212 (an example of the sound engine 106 in FIG. 1) may receive an output from the array 210 and perform processing such as dereverberation 218, sound source extraction 216, and sound source localization 214.

Sound dereverberation 218 may remove reverberations and echoes from the captured sound. Sound source localization 214 may include performing algorithms, such as direction of arrival, time difference of arrival, interaural time difference, interaural level differences, head-related transfer function, machine learning, or the like or combination thereof. Sound source extraction 216 (or sound source separation) may include performing operations such as blind source separation and beamforming operations.

The sound engine 212 may then generate sound information as an output that can be displayed on or presented by a device as guidance. In this example, the sound information may be presented in a display device 220 (e.g., a screen of a laptop computer or other device). If the display device 220 is part of an AR device, spatial mapping 222 may be incorporated. In other words, the sound information output from the sound engine 212 may be incorporated into the spatial mapping 222.

In this manner, the sound information generated by the sound engine 212 is visualized and presented to the user 230. The user 230 may provide feedback that can be used to improve the operation of the sound engine 212. The user 230 may be able to select individual sound sources and provide feedback that can be used to improve the overall operation. The sound engine 212 may be associated with preferences saved in a user profile. The user feedback can be associated with the user profile such that, over time, the user experience and personalization can be improved. This allows the interface to customize itself to different users.

Figure 3:
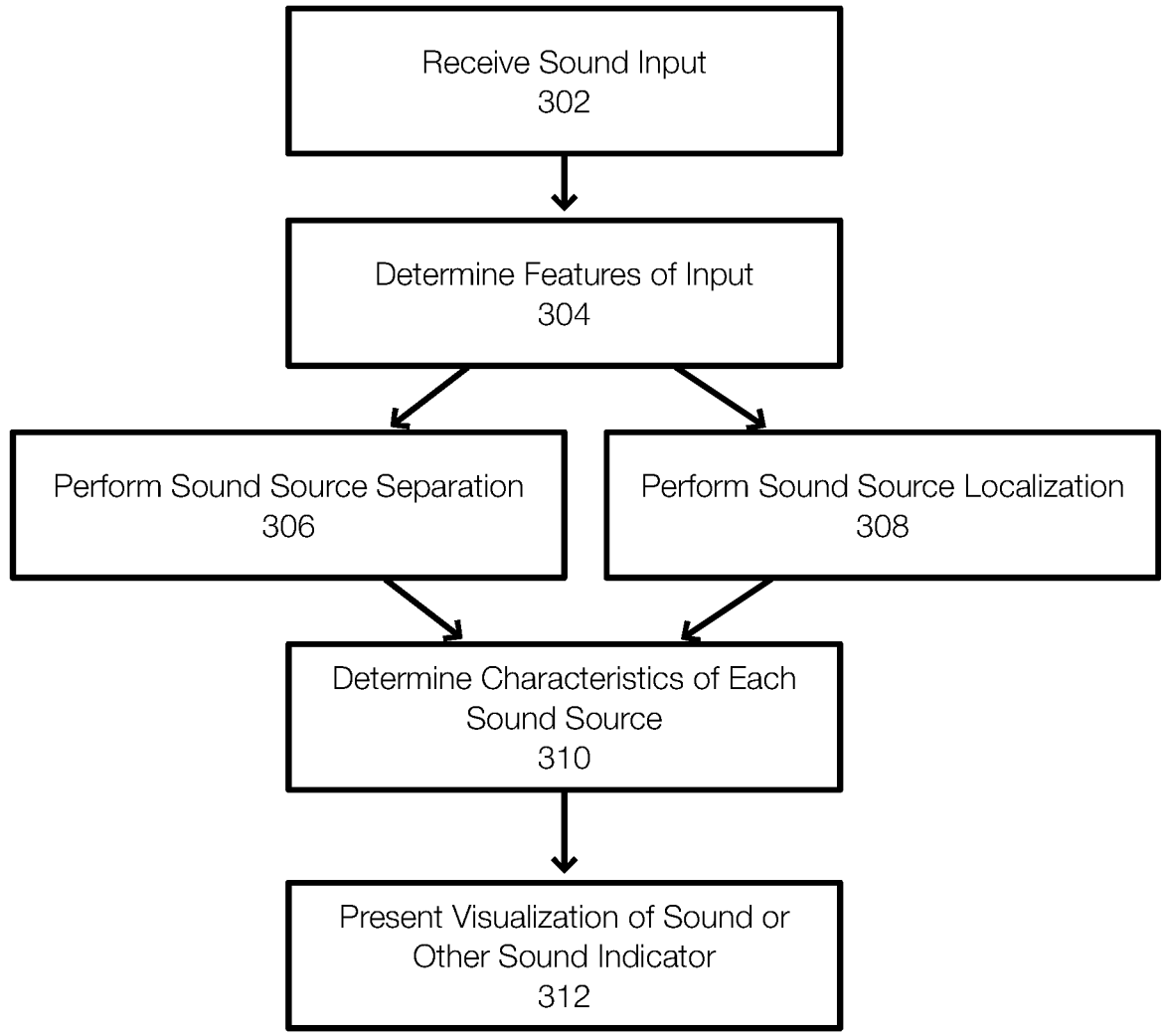
FIG. 3 discloses aspects of a method for generating and providing guidance to a user regarding sound sources in an environment.

FIG. 3 illustrates discloses aspects of sound operations including aspects of performing sound source localization and/or sound source separation. In the method shown in FIG. 3, sound input is received 302. The input includes all sound or sound signals received by the relevant microphone arrays in the environment. In other words, L u the input received by an array includes all of the sounds in the environment. The features of the input are determined 304 and extracted as input for a machine learning model, which model has been trained on previous sound data.

Using the machine learning model, sound source separation is performed 306 and sound source localization is performed 308. In effect, the machine learning model (e.g., part of the sound engine) may be configured separate all of the sounds included in the input to the microphone array and localize or locate each of the sounds in the environment. Thus, each sound source in the environment can be identified. The characteristics (e.g., direction, loudness, SPL, trajectory) of each sound source can be determined 310.

Next, a visualization of the sound is presented 312 on a display device using the output or sound information output by the sound engine. In addition or in the alternative, haptic guidance or other guidance may be provided to a user.

More specifically, input to the machine learning model or to the sound engine may include parameters of the microphone array (or arrays), real time audio information collected by sensing (the sounds), acoustic parameters, or the like. The sound engine may also receive user setting or preferences as input. If a certain sound (e.g., a favorite person) is recognized, this input from the user profile may allow the system to automatically prioritize visualization for that sound source. A user may be able to overwrite the prioritization as well.

During training, the machine learning model or sound engine learns to separate different sounds from each other and learns to output, for each sound source, one or more of SPL, location, type, identification of known or favorite sounds, a sound map with all of the sound sources identified therein, or the like or combination thereof.

Figure 4:
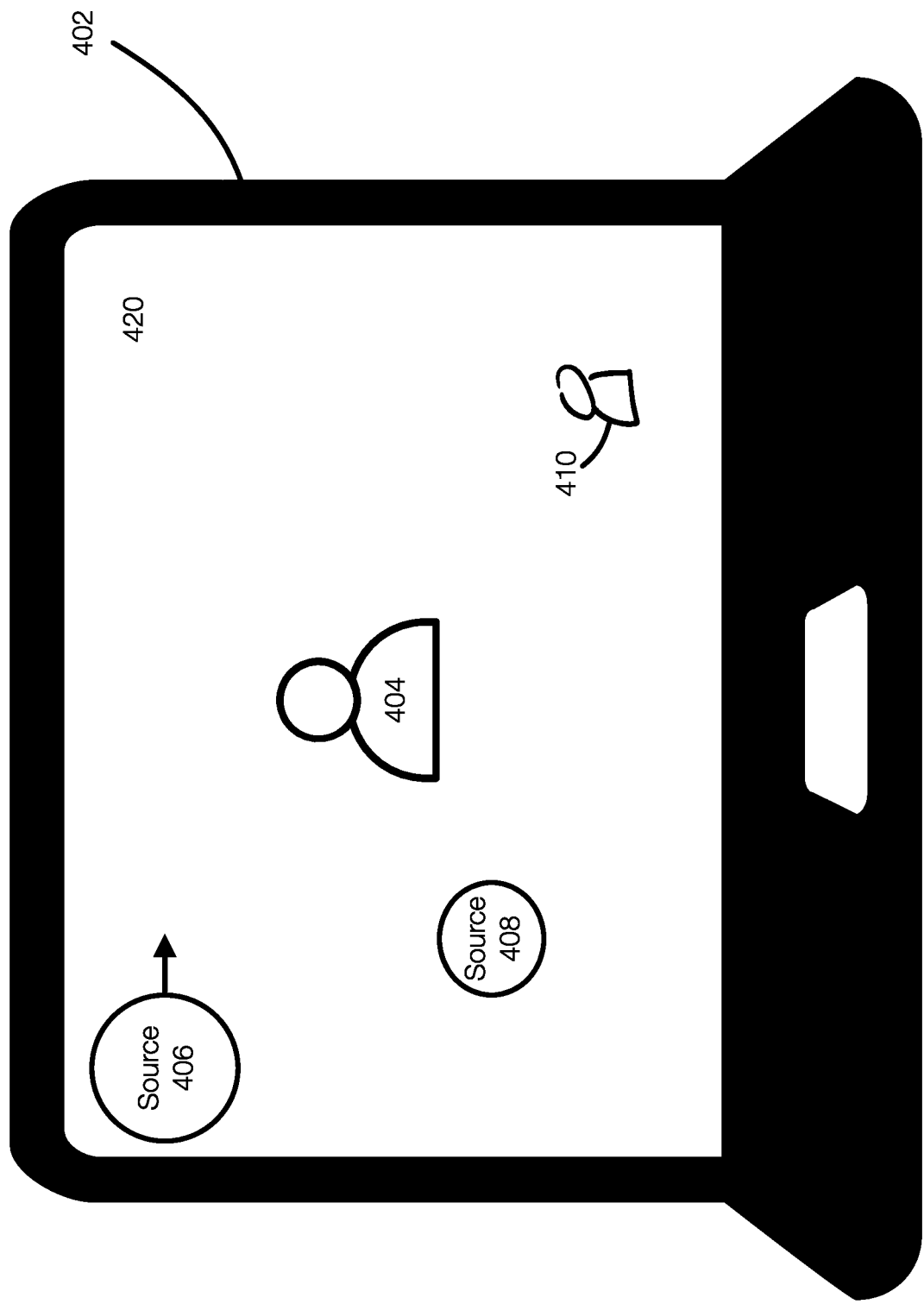
FIG. 4 discloses aspects of guidance presented visually to a user in a user interface.

FIG. 4 depicts aspects of visualizing sound or sound information in a user interface. FIG. 4 illustrates a device 402 that includes a user interface 420. In this example, sound information, such as output from a sound engine, is visualized in the user interface 420. In this example, the user interface 420 may be configured to depict an environment. The user interface 420 may include a position of the user 404.

The sound information describes the sound sources in the environment that have been detected by the microphone array(s). In this example, the sound sources are described using directions such as north, south, east, and west. However, other relative position/location indicators (e.g., such as left, right, behind, in front) may be used. The relationship of the user 404 to the device 402 (or the expected relationship) may be used to orient the placement of the sound information in the user interface 420. For example, a user is typically facing the device 402. The user interface 420 may also be configured to present the sound information in two, three, or n dimensions. For example, the user interface 420 may present a three dimensional depiction of the user's environment and place the sound sources therein based on the output of the sound engine.

In this example and assuming that north is in front of the user, the sound source 406 is determined to be northwest of the user 404. The sound source 406 is moving east or to the right as depicted by the arrow. A circle, representing a SPL of the source 406 is larger than a circle representing the SPL of the source 408. Thus, the source 406 has a larger SPL that is conveyed visually to the user 404. Specific numbers or other visual cues may also be displayed.

In the user interface 420, a person 410 is depicted or located southeast of the user 404 in the user interface 420. The sound engine may have identified the sound source (or person 410) as speech or a person. Thus, the type of noise or sound may also be conveyed visually. An icon of a person indicates that the sound source is human speech. A specific speaker could also be identified. An icon of a car may indicate external traffic noise. Other icons may indicate other sound types or sources.

If a person with hearing loss is viewing the user interface 420 and is being spoken to by the person 410, the user 404 has visual guidance that allows the user 404 to understand where the speaker is—the position of the person 410. The user 404 can the orient herself to better hear the person 410. As demonstrated by this example, the user interface 420 can be used to visually represent sound information such as direction of sounds, loudness/SPL, location/distance, type of sound, sound source trajectory, or the like or combination thereof. The distance from the user 404 (or user icon) to the sound source may convey distance.

The visualization provided in the user interface 420 can range from simplified to comprehensive. The visualization, in some examples, may depend on the size and/or type of device. For large displays or AR devices, many characteristics may be displayed in the display in real time. This may include the entire sound field/environment and may include all sound sources including the user. The information presented in the user interface 420 may also be layered. A user may select a specific sound source, for LU example. Once selected, a next level of information may be displayed such as type or loudness. Another layer may be presented that may display distance, trajectory or the like. The information can be layered in different ways for different devices. In a smaller screen, the sound sources may be represented with more simply visual depictions such as an arrow with numbers. A user may have the ability to pre-configure their preferences relating at least to how sound sources are prioritized and displayed.

Sound information can also be presented haptically. When the guidance is presented to the user, the user's device may vibrate in a pattern to convey information about sound sources in the environment. If a display is also available, selecting a sound source may cause the device to vibrate a particular number of times or in a pattern to represent loudness or other characteristic. The pattern or other notification to the user may be set in user preferences. For example, the user may associate certain vibration types or patterns with certain sound sources, types of sound sources, or attributes.

For example, a user may receive one vibration for a sound to the left and two vibrations for a sound to the right of the user. A short vibration may cause the user to look forward and a single longer vibration may cause the user to look to the rear direction. In some examples, some sound sources may be ignored. For example, the haptic feedback may be provided only when speech is detected. This allows a user to know when someone may be speaking to the user and may allow the user to know where the speech is coming from (e.g., right, left, behind the user).

If the user is mobile, such as when wearing an AR device, the visual information can be updated in real-time or near real time with sound information. Thus, the visual guidance representing sound information is continually updated in the display.

Figure 5:
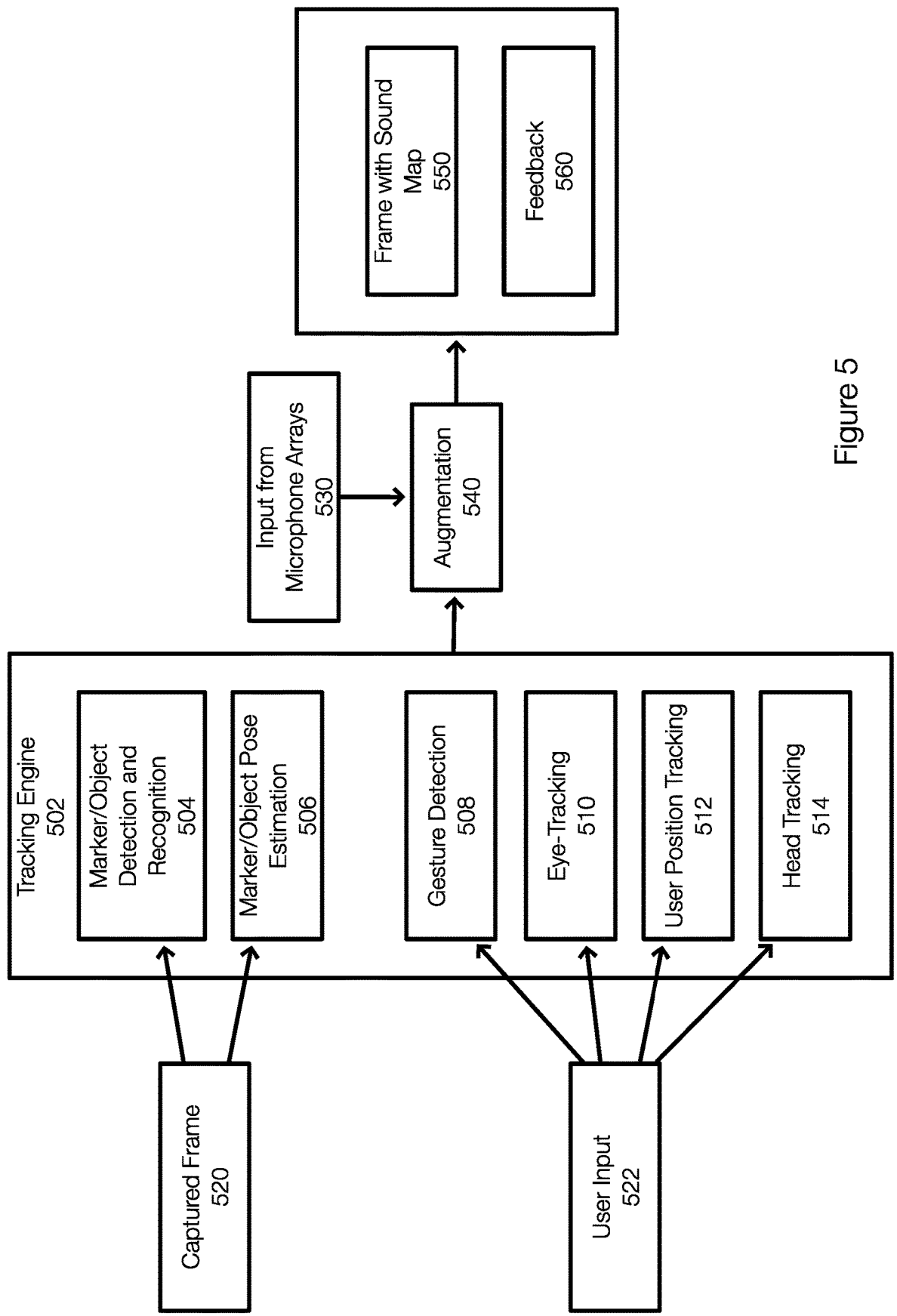
FIG. 5 discloses aspects of augmenting graphic data with sound information generated by a sound engine regarding sound sources in an environment.

FIG. 5 depicts aspects of AR based sound quality operations. FIG. 5 illustrates a tracking engine 502 that may operate in the context of an AR device. The tracking engine 502 may perform marker/object detection and recognition 504 and marker/object pose estimation 506 based on a captured frame 520. The tracking engine 502 may also perform gesture detection 508, eye-tracking 510, user position tracking 512, and head tracking 514 based on user input 522.

Input 530 from microphone arrays is then used to perform augmentation 540. The augmentation 540 may include incorporation sound information into the graphic data presented by the AR device. Thus, the result is to output a frame with a sound map 550 or a frame that includes the relevant sound information. Feedback 560, such as feedback from the user, may be used to improve the sound from the sound sources as well as the augmentation 540.

For AR glasses/headset devices, the virtual 3D sound information is overlaid with the real world. The sound source information can be overlayed onto the sound source in the display. More specifically, the sound source information can be overlayed onto the sound source. For example, is a person is talking, the visual guidance or sound information will be overlaid onto or next to the person and show real time sound source data. For devices such as smart phones or tablets, scanning for marker registration allows the user to hold the smart device around the environment to see all the virtual audio information overlaid onto the real world, which may also be updated based on user movement.

Embodiments of the invention ensure that changes in the captured camera frames are properly aligned with the sound information based on results from the tracking engine 502. For example, in a marker-based approach, accurate tracking is performed using markers. The camera in the AR device can recognize the user environment with computer vision technologies. The tracking engine 502 can then determine the relative pose of the camera based on the correctly detected and recognized marker in the scene. In this example, the marker/object pose estimation may relate to the six degrees of freedom position, which is the 3D location and 3D orientation of an object. The eye-tracking 510 may include tracking modules embedded in the device to use gaze point as a control point for the AR world. The output after augmentation 540 thus generates virtual audio information for the user such that better sound awareness is available. Further guidance may be provided in the user interface to guide the user to have better audio quality.

In addition to visual guidance, the output from the sound engine may be used to provide haptic guidance, voice guidance, or the like or combination thereof. As previously described, haptic feedback may include vibrating the device or vibration with ringing or other sound. The larger the vibration, the larger the loudness/SPL. The direction of the sound may depend on the vibration mode or pattern.

In voice guidance, a voice may tell the user that a sound is coming from the left or from another direction.

In addition, some sounds may be transformed. For example, speech may be transformed to a higher pitched voice if this aids the user in hearing/understanding the speech. The frequency may be optimized for a user. The feedback provided by the user may include a request to change the pitch.

In one example, the user may perform an initialization process, which may include testing the user, to identify which visual/haptic/voice settings are best for the user.

Embodiments of the invention provide a better user experience and increase the user's sound awareness. By retrieving acoustic information around the user in real time, sound sources can be separated and localized. Guidance regarding these sound sources can be presented to the user in real time visually, haptically, vocally, or the like or combination thereof.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, sound quality operations, which may include, but are not limited to, sound localization operations, sound separation operations, guidance presentation operations, sound visualization operations, or the like. Operations also include visually mapping sound information that is based on sounds from sound sources in an environment. More generally, the scope of the invention embraces any operating environment in which the disclosed concepts may be useful.

Example cloud computing environments, edge environments, or other compute environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM) or containers.

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment.

Following are some further example embodiments of the invention. These are presented only by way of example and are not intended to limit the scope of the invention in any way.

Embodiment 1. A method, comprising: receiving sound signals from sound sources in an environment into a microphone array, performing sound source separation to separate the sound sources, performing sound source localization to locate each of the sound sources, generating sound information based on the sound separation and the source localization, and presenting guidance to a user regarding each of the sound sources in the environment, the guidance including the sound information.

Embodiment 2. The method of embodiment 1, further comprising presenting a visual representation of each of the sound sources in a user interface of a device, therein the visual representation includes a graphic representation of the sound information.

Embodiment 3. The method of embodiment 1 and/or 2, further comprising determining features from the sound signals received by the microphone array and inputting the features to a sound engine, wherein the sound engine generates an output that includes, for each of the sound sources, one or more of an SPL/loudness value, a location, a type, an identification of a favorite sound source, and/or a sound map.

Embodiment 4. The method of embodiment 1, 2, and/or 3, wherein the guidance comprises a user interface and wherein the output of the sound engine is presented graphically in the user interface.

Embodiment 5. The method of embodiment 1, 2, 3, and/or 4, further comprising presenting the guidance as a haptic response, wherein the response includes vibrations to indicate at least location of a sound source.

Embodiment 6. The method of embodiment 1, 2, 3, 4, and/or 5, further comprising presenting the guidance a voice response.

Embodiment 7. The method of embodiment 1, 2, 3, 4, 5, and/or 6, further comprising augmenting graphic data presented by the device with sound information included in the guidance.

Embodiment 8. The method of embodiment 1, 2, 3, 4, 5, 6, and/or 7, wherein the graphic data is generated by a camera subject to marker detection and recognition and subject to marker pose estimation, wherein the augmentation accounts for user input including gesture detection, eye-tracking, user position, and user head movement.

Embodiment 9. The method of embodiment 1, 2, 4, 5, 6, 7, and/or 8, wherein the sound source separation, the sound source localization, and generating sound information are performed by a machine learning model.

Embodiment 10. The method of embodiment 1, 2, 3, 4, 5, 6, 7, 8, and/or 9, wherein the microphone array is integrated with a user device or further comprising multiple microphone arrays, some of which are external to the user device.

Embodiment 11. A method for performing any of the operations, methods, or processes, or any portion of any of these or portions thereof, disclosed herein.

Embodiment 12. A non-transitory storage medium having stored therein instructions that are executable by one or more hardware processors to perform operations comprising the operations of any one or more of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon.

Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
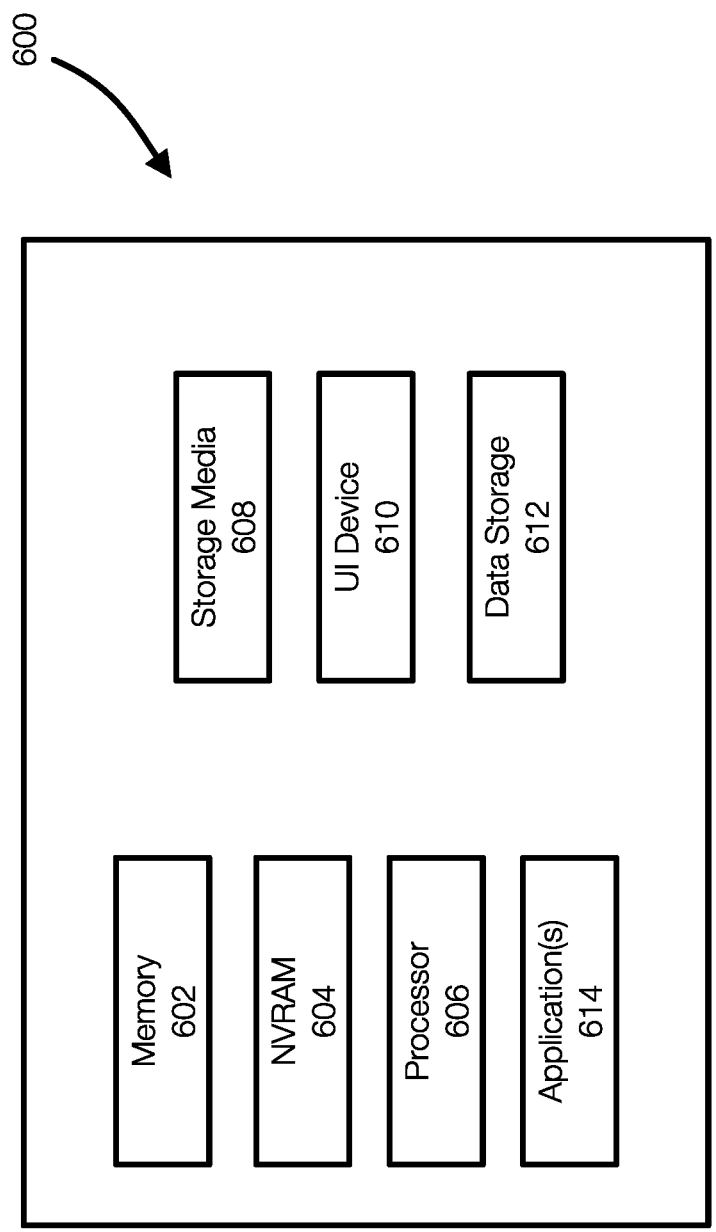
FIG. 6 discloses aspects of a computing system or device in which a sound engine and other aspects of embodiments of the invention may be implemented.

With reference briefly now to FIG. 6, any one or more of the entities disclosed, or implied, by FIGS. 1-6 and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    receiving sound signals from sound sources in an environment into a microphone array;
    performing sound source separation to separate the sound sources;
    performing sound source localization to locate each of the sound sources;
    generating sound information based on the sound separation and the source localization;
    presenting a layered visual representation of each of the sound sources in a user interface of a device, wherein the layered visual representation of each of the sound sources comprises a first layer of information about the sound source and a second layer of information about the sound source, the first and second layers of information being presented in response to receipt of user input;
    presenting haptic guidance to a user, wherein the haptic guidance includes a haptic response, wherein the haptic response includes a vibration configured to indicate at least a location of the sound source relative to the user, and wherein different vibration patterns correspond to different locations; and
    presenting visual guidance to the user in the user interface regarding each of the sound sources in the environment, the visual guidance including the sound information and providing situational awareness to the user in the environment, wherein the sound information includes a sound pressure level (SPL)/loudness of each sound source, a direction to each sound source, a distance to each sound source, and/or a trajectory of each sound source, wherein a size of a graphical representation of each sound source corresponds to a magnitude of sound signals therefrom, wherein graphical representations of the sound sources are overlaid onto video frames, and wherein the first and second layers of information about each sound source are overlaid over a respective graphical representation of each sound source.

2. The method of claim 1, wherein the visual representation includes a graphic representation of the sound information.

3. The method of claim 1, further comprising determining features from the sound signals received by the microphone array and inputting the features to a sound engine, wherein the sound engine generates an output that includes, for each of the sound sources, one or more of an SPL/loudness, the location, a type, an identification of a favorite sound source, and/or a sound map.

4. The method of claim 3, wherein the output of the sound engine is presented graphically in the user interface, wherein the user interface is associated with user configurable settings that determine how the output is presented in the user interface, and wherein feedback provided by the user is used to update the user configurable settings.

5. The method of claim 1, further comprising presenting additional guidance, the additional guidance including a voice response, as tones, or a transformed voice response, wherein the tones or the transformed voice response are based on a hearing range and/or environment of the user.

6. The method of claim 1, further comprising augmenting graphic data presented by the device with the sound information included in the visual guidance with an augmentation.

7. The method of claim 6, wherein the graphic data is generated by a camera subject to marker detection and recognition and subject to marker pose estimation, and wherein the augmentation accounts for user input including gesture detection, eye-tracking, user position, and user head movement.

8. The method of claim 1, wherein the sound source separation, the sound source localization, and generating sound information are performed by a machine learning model.

9. The method of claim 1, wherein the microphone array is integrated with a user device or further comprising multiple microphone arrays, some of which are external to the user device.

10. A non-transitory storage medium having stored therein instructions that are executable by one or more hardware processors to perform operations comprising:

receiving sound signals from sound sources in an environment into a microphone array;

performing sound source separation to separate the sound sources;

performing sound source localization to locate each of the sound sources;

generating sound information based on the sound separation and the source localization;

presenting a layered visual representation of each of the sound sources in a user interface of a device, wherein the layered visual representation of each of the sound sources comprises a first layer of information about the sound source and a second layer of information about the sound source, the first and second layers of information being presented in response to receipt of user input;

presenting haptic guidance to a user, wherein the haptic guidance includes a haptic response, wherein the haptic response includes a vibration configured to indicate at least a location of the sound source relative to the user, and wherein different vibration patterns correspond to different locations; and presenting visual guidance to the user in the user interface regarding each of the sound sources in the environment, the guidance including the sound information and providing situational awareness to the user in the environment, wherein the sound information includes a sound pressure level (SPL)/loudness of each sound source, a direction to each sound source, a distance to each sound source, and/or a trajectory of each sound source, wherein a size of a graphical representation of each sound source corresponds to a magnitude of sound signals therefrom, wherein graphical representations of the sound sources are overlaid onto video frames, and wherein the first and second layers of information about each sound source are overlaid over a respective graphical representation of each sound source.

11. The non-transitory storage medium of claim 10, wherein the visual representation includes a graphic representation of the sound information.

12. The non-transitory storage medium of claim 10, further comprising determining features from the sound signals received by the microphone array and inputting the features to a sound engine, wherein the sound engine generates an output that includes, for each of the sound sources, one or more of an SPL/loudness, the location, a type, an identification of a favorite sound source, and/or a sound map.

13. The non-transitory storage medium of claim 12, wherein the output of the sound engine is presented graphically in the user interface, wherein the user interface is associated with user configurable settings that determine how the output is presented in the user interface, and wherein feedback provided by the user is used to update the user configurable settings.

14. The non-transitory storage medium of claim 10, further comprising presenting additional guidance, the additional guidance including a voice response, as tones, or a transformed voice response, wherein the tones or the transformed voice response are based on a hearing range and/or environment of the user.

15. The non-transitory storage medium of claim 10, further comprising augmenting graphic data presented by the device with the sound information included in the visual guidance with an augmentation.

16. The non-transitory storage medium of claim 15, wherein the graphic data is generated by a camera subject to marker detection and recognition and subject to marker pose estimation, and wherein the augmentation accounts for user input including gesture detection, eye-tracking, user position, and user head movement.

17. The non-transitory storage medium of claim 10, wherein the sound source separation, the sound source localization, and generating sound information are performed by a machine learning model.

18. The non-transitory storage medium of claim 10, wherein the microphone array is integrated with a user device or further comprising multiple microphone arrays, some of which are external to the user device.

* * * * *

UNITED STATES PATENT AND TRADEMARK OFFICE
CERTIFICATE OF CORRECTION

| | | |
|---|---|---|
| PATENT NO. | : 12,432,521 B2 | Page 1 of 1 |
| APPLICATION NO. | : 17/451775 | |
| DATED | : September 30, 2025 | |
| INVENTOR(S) | : Danqing Sha et al. | |

It is certified that error appears in the above-identified patent and that said Letters Patent is hereby corrected as shown below:

In the Specification

Column 1
Line 36, change "to help hearing impaired person" to – to help hearing impaired persons –

Column 2
Lines 29-30, change "may receiving input" to – may be receiving input –
Line 59, change "vibrations patterns" to – vibration patterns –

Column 6
Line 61, change "can the orient herself" to – can then orient herself –

Column 7
Line 67, change "is a person is talking" to – if a person is talking –

Signed and Sealed this
Twenty-third Day of December, 2025

John A. Squires
*Director of the United States Patent and Trademark Office*